Patented Sept. 15, 1953

2,651,886

UNITED STATES PATENT OFFICE 2,651,886

METHOD OF CONDITIONING AGRICULTURAL SOIL AND GROWING PLANTS THEREIN

David T. Mowry and Ross M. Hedrick, Dayton, Ohio, assignors to Monsanto Chemical Company, St. Louis, Mo., a corporation of Delaware No Drawing. Application June 26, 1952, Serial No. 295,845

The portion of the term of the patent subsequent to January 13, 1970, has been disclaimed and dedicated to the public 19 Claims. (Cl. 47—58)

This invention relates to methods of conditioning agricultural soils and more specifically to novel methods of developing increased aggregation of a more permanent nature in surface soils.

In applications of David T. Mowry and Ross M. Hedrick, Serial Nos. 148,521 and 148,522, filed March 8, 1950, both of which are now abandoned, and Serial No. 271,280, filed February 12, 1952, which has now issued as U. S. Patent No. 2,625,529, there are described and claimed classes of soil conditioning agents and methods for their use in improving yields of agricultural soils and in minimizing soil losses through erosion. These applications, of which this is a continuation-in-part, contain subject matter which has not been heretofore claimed and which is hereinafter described and claimed.

The agents which are useful in conditioning soils induce a highly aggregated condition which is more permanent than naturally occurring soil aggregation. As a result optimum conditions for plant growth are obtained by increasing moisture content of the soil, reducing surface evaporation, increasing air excess to root structures, preventing slaking and crusting and improving drainage. At the same time the soil, and even normally heavy clay soils, possesses a light porous structure and is thereafter easily cultivated.

Useful conditioning agents are the water-soluble polymeric polyelectrolytes having a weight average molecular weight of at least 10,000, and which contain substantially linear continuous carbon chains derived by the polymerization of an aliphatic unsaturated carbon to carbon double bond. The expression, "water-soluble" is intended to include compounds which are soluble in either distilled water or in soil water and also those which swell and become dispersed in aqueous media. The expression, "substantially linear," defines a normal polymer structure as prepared by the polymerization of a mono-olefinic monomer and possessing a minimum of cross-linking structures, which tend to render the polymer water-insoluble and reduce the effectiveness of the aggregation.

Suitable agents of this class are the copolymers of maleic anhydride, maleic acid, salts of maleic acid, and maleic amides with any copolymerizable mono-olefinic monomer, such as vinyl acetate, vinyl alkyl ethers, vinyl chloride, and isobutylene, particularly the alkaline metal, ammonium, and alkaline earth metal salts of said copolymers. Copolymers of this type include the partial calcium salts of the copolymer of vinyl acetate and maleic acid, the half-ammonium salt, half-amide of the copolymer of isobutylene and maleic acid, and the potassium salts of a copolymer of a vinyl alkyl ether and maleic acid. Other useful polymers are the polymers of acrylic acid, methacrylic acid and derivatives thereof, such as alkaline earth metal salts, calcium salts and ammonium salts, and the copolymers of the said acrylic and methacrylic acid derivatives with other mono-olefinic monomers copolymerizable therewith. Typical examples of this type are polyacrylic acid, the alkali metal, ammonium and calcium salts of polyacrylic acid, the partial calcium salts, the alkali metal salts and the ammonium salts of hydrolyzed polyacrylonitrile. A comprehensive enumeration of suitable polyelectrolytes and numerous examples of typical preparations are set forth in the application, Serial No. 271,280, filed February 12, 1950, by David T. Mowry and Ross M. Hedrick.

The practice of the present invention involves an exceptionally efficient means of using solid polymeric polyelectrolytes. In general solid polymers are difficult to mix uniformly in the soil and the moisture content is critical to the success of the treatment. If the moisture content is too high polymers become swollen, in which condition they cannot be intimately dispersed in the soil and the aggregate effect is inefficient. On the other hand, mixing with dry soils will not induce immediate aggregation since the reaction between the soil particles and the polymeric polyelectrolytes takes place through the medium of soil moisture. Furthermore, inadequate mixing and incomplete reaction between the polymer and the soil particles invariably produces soils with low content of water-stable aggregates. The primary purpose of the present invention is to provide a new and more efficient method for incorporating solid polymers in agricultural soils. A further purpose of this invention is to enable the production of soils with unusually high content of water-stable aggregates.

It has been found that soils with the maximum content of water-stable aggregates can be prepared easily and quickly by following a well-defined procedure. The method described more fully hereinafter and set forth in the claims involves a preliminary treatment of the soil followed by mixing with the solid polymer, thereafter saturating the soil with water, and finally recultivating to form the desired size aggregates.

The initial step involves the cultivation of the soil by any conventional process, plowing or spading followed by harrowing or raking. It is desirable to have the upper layers of the soil quite dry, for example less than 20 per cent moisture before adding the polymer. Similarly it is very desirable to have the soil broken up into as small particles as is practicable. Both of these properties can be developed simultaneously by disking, harrowing or raking at intervals, for example on two or more successive days, thereby permitting exposure of the lower soil to dry air or to the sun's radiation. The soil which is apparently dry and pulverant will have a moisture content of from four to 15 per cent depending upon the physical nature of the soil. Some heavy clay soils will be apparently dry at 15 per cent moisture content, while sandy soils may be wet at the same moisture content. The dryness required for effective incorporation is that which will enable the deposition of the pulverant polymer on the soil without causing gelation. Although certain low water content soils may induce gelation upon long contact with the polymer, these may be effectively worked if the mixing takes place soon after the polymer deposition. It is desirable however for the moisture which remains in the soil to be firmly bonded and below that which will permit dissolution of the polymer therein.

After the soil has been prepared in a dry and finely divided state it is mixed with the solid pulverant polymer. The polymer may be applied by hand, or preferably with a mechanical spreading device, such as is conventional for the application of pulverant fertilizers. The application of the polymeric polyelectrolytes should be as uniform as possible and should deposit enough polymer so as to provide from 0.0001 to 1.0 per cent based upon the weight of the soil to the depth of cultivation, or to the depth of the desired aggregation. The polymer should be then mixed into the soil by means of raking, harrowing, disking, or rototilling so as to achieve as thorough mixing as possible. In this dry state little, if any, combination of the soil particles with the polymer can take place.

The thoroughly mixed soil is then saturated with water. This may be effected by flooding, pre-irrigation or merely by exposure of the soil to natural rainfall. The excess water especially when applied suddenly or with force as from a jet, may cause breaking down of the natural unstable aggregates and cause compaction of the soil to an undesired extent. By saturating the soil there is ample time for the polymer to dissolve in the soil water and thereafter be contacted with the soil particles.

After the polymer dissolves in the water and the water diffuses through and around the soil aggregates, it may be necessary to form the stable aggregates and develop the interstitial air spaces. This is preferably done after the excess water is drained from the soil. Preferred practice involves gently cultivating the moist surface, and continuing the operation until the moist soil crumbles to form aggregates of the desired size.

Further details of this process and a comparison of the aggregate stability of soils prepared by different methods are set forth in the following examples:

Example 1

To demonstrate the efficiency of the partial calcium salt of the copolymer of vinyl acetate and maleic acid in aggregating soils of varied moisture content, field plots of different moisture content were mixed with 0.05 per cent of the polymer. The percentage of water-stable aggregates measured in the different plots are set forth in the table below:

| Initial Moisture Content of Soil | Aggregate Stability After Mixing | After Re-tilling |
|---|---|---|
| 28.6 | 30 | 41 |
| 21.8 | 41 | 43 |
| 10 | 40 | 39 |
| 4.4 | 45 | 39 |

Another plot with moisture content of 4.4 per cent was treated in the same manner except that it was saturated with water. Upon mechanical working after drying to a workable condition, 77 per cent water-stable aggregates were found to be present.

Example 2

The previous example was repeated except that the sodium salt of hydrolyzed polyacrylonitrile was used as the aggregating agent. The following data were recorded.

| Initial Moisture Content of Soil | Aggregate Stability After Mixing | After Re-tilling |
|---|---|---|
| 23.4 | 24 | 37 |
| 20.0 | 39 | 40 |
| 7.3 | 32 | 35 |
| 4.4 | 47 | 47 |

The pilot with original moisture content of 4.4 per cent was saturated with water and aggregated by mechanical working to yield a soil with 62 per cent of water-stable aggregates.

The aggregate stability is the per cent of aggregates greater than 0.25 mm. after a wet-seiving test, which is a standard procedure described in detail in application, Serial No. 271,280, filed February 12, 1952, now issued as U. S. Patent No. 2,625,529.

Some polymeric compositions are useful as soil aggregators, even though in dry state they may not be polyelectrolytes. For example, copolymers of maleic anhydride and vinyl acetate are not strictly polyelectrolytes but in the presence of soil water are converted to maleic acid copolymers, which are polyelectrolytes. Thus, in the form in which the polymers react with or are adsorbed on the soil, they are true polyelectrolytes. Thus the invention is useful with respect to water-soluble vinyl type polymers of weight average molecular weight over 10,000 and which are water-soluble electrolytes or which generate polyelectrolytes in presence of water.

What we claim is:

1. A method of conditioning agricultural soil with polymers having weight average molecular weights greater than 10,000, and a substantially linear structure derived by the polymerization of a mono-olefinic compound through the aliphatic unsaturated group, said polymer being selected from the class consisting of water-soluble polyelectrolytes and polymers which react with soil moisture to generate water-soluble polyelectrolytes, which comprises spreading the solid polymer on a dry soil, cultivating the soil to disperse the polymer in the soil, and saturating the cultivated soil with water.

2. The method defined by claim 1 wherein the polymer is a calcium salt of a hydrolyzed polymer of acrylonitrile.

3. The method defined by claim 1 wherein the polymer is a sodium salt of a hydrolyzed polymer of acrylonitrile.

4. The method defined by claim 1 wherein the polymer is a copolymer of vinyl acetate and a partial ester of maleic anhydride and methyl alcohol.

5. The method defined by claim 1 wherein the polymer is an ammonium salt of a copolymer of maleic acid and isobutylene.

6. The method defined by claim 1 wherein the polymer is a copolymer of a mono-olefinic dicarboxylic acid anhydride and at least one other mono-olefinic monomer.

7. The method defined by claim 1 wherein the polymer is a copolymer of vinyl acetate and maleic anhydride.

8. A method of treating tillable surface coil which normally tends to slake or erode with polymeric water-soluble polyelectrolytes of high molecular weight containing a substantially linear structure derived by the polymerization of a mono-olefinic compound through an aliphatic unsaturated group, which comprises spreading the solid polymer on a dry soil, cultivating the soil to disperse the polymer in the soil, and saturating the cultivated soil with water.

9. The method defined by claim 8 wherein the polymeric polyelectrolyte is a calcium salt of a hydrolyzed polymer of acrylonitrile.

10. The method defined by claim 8 wherein the polymeric polyelectrolyte is a sodium salt of a hydrolyzed polymer of acrylonitrile.

11. The method defined by claim 8 wherein the polymeric polyelectrolyte is a copolymer of vinyl acetate and a partial ester of maleic anhydride and methyl alcohol.

12. The method defined by claim 8 wherein the polymeric polyelectrolyte is an ammonium salt of a copolymer of maleic acid and isobutylene.

13. A method of conditioning agricultural soil with polymers having weight average molecular weights greater than 10,000, and a substantially linear structure derived by the polymerization of a mono-olefinic compound through the aliphatic unsaturated group, said polymer being selected from the class consisting of water-soluble polyelectrolytes and polymers which react with soil moisture to generate water-soluble polyelectrolytes, which comprises drying the soil, spreading the solid polymer on the dry soil, cultivating the soil to disperse the polymer in the soil, saturating the cultivated soil with water and recultivating the soil to develop water-stable aggregates.

14. A method of conditioning agricultural soil with polymers having weight average molecular weights greater than 10,000, and a substantially linear structure derived by the polymerization of a mono-olefinic compound through the aliphatic unsaturated group, said polymer being selected from the class consisting of water-soluble polyelectrolytes and polymers which react with soil moisture to generate water-soluble polyelectrolytes, which comprises drying the soil by cultivation to expose lower areas to dry atmospheres, spreading the solid polymer on the dry soil, cultivating the soil to disperse the polymer in the soil, saturating the cultivated soil with water and recultivating the soil to develop water-stable aggregates.

15. A method of conditioning agricultural soil with polymers having weight average molecular weights greater than 10,000, and a substantially linear structure derived by the polymerization of a mono-olefinic compound through the aliphatic unsaturated group, said polymer being selected from the class consisting of water-soluble polyelectrolytes and polymers which react with soil moisture to generate water-soluble polyelectrolytes, which comprises drying the soil by a plurality of successive cultivations, spreading the solid polymer on the dry soil, cultivating the soil to disperse the polymer in the soil, saturating the cultivated soil with water and recultivating the soil to develop water-stable aggregates.

16. A method of treating tillable surface soil which normally tends to slake or erode with polymeric water-soluble polyelectrolytes of high molecular weight containing a substantially linear structure derived by the polymerization of a mono-olefinic compound through an aliphatic unsaturated group, which comprises drying the soil, spreading the solid polymer on the dry soil, cultivating the soil to disperse the polymer in the soil, saturating the cultivated soil with water and recultivating the soil to develop water-stable aggregates.

17. A method of treating tillable surface soil which normally tends to slake or erode with polymeric water-soluble polyelectrolytes of high molecular weight containing a substantially linear structure derived by the polymerization of a mono-olefinic compound through an aliphatic unsaturated group, which comprises drying the soil by cultivation to expose lower areas to dry atmospheres, spreading the solid polymer on the dry soil, cultivating the soil to disperse the polymer in the soil, saturating the cultivated soil with water, and recultivating the soil to develop water-stable aggregates.

18. A method of treating tillable surface soil which normally tends to slake or erode with polymeric water-soluble polyelectrolytes of high molecular weight containing a substantially linear structure derived by the polymerization of a mono-olefinic compound through an aliphatic unsaturated group, which comprises drying the soil by a plurality of successive cultivations, spreading the solid polymer on the dry soil, cultivating the soil to disperse the polymer in the soil, saturating the cultivated soil with water and recultivating the soil to develop water-stable aggregates.

19. A method of treating tillable soil which normally tends to slake and erode, which comprises spreading a solid polymeric composition on as oil containing less than twenty per cent moisture, cultivating the soil to form aggregates and to disperse the polymer, and wetting the cultivated soil with water, said solid polymeric composition being of a weight average molecular weight in greater than 10,000 and selected from the group consisting of: polymers of acrylic acid, salts of polymers of acrylic acid, salts of hydrolyzed polymers of acrylonitrile, hydrolyzed polymers of acrylonitrile, polymers of methacrylic acid, salts of polymers of methacrylic acid, salts of hydrolyzed polymers of methacrylonitrile, hydrolyzed polymers of methacrylonitrile, salts of copolymers of unsaturated polycarboxylic acids and at least one other mono-olefinic monomer, copolymers of unsaturated polycarboxylic acids and at least one other mono-olefinic monomer, salts of hydrolyzed copolymers of unsaturated polycarboxylic acid anhydrides and at least one other mono-olefinic monomer, hydrolyzed copolymers of unsaturated polycarboxylic acid anhydrides and at least one other mono-olefinic monomer, salts of copolymers of the partial alkyl esters of unsaturated polycarboxylic acids and at least one other mono-olefinic monomer, copolymers of unsaturated dicarboxylic acid anhydrides and at least one other mono-olefinic monomer, copolymers of the partial alkyl esters of unsaturated polycarboxylic acids and at least one other mono-olefinic monomer, salts of sulfonated polymers of hydrocarbons containing aliphatic unsaturation, sulfonated polymers of hydrocarbons containing aliphatic unsaturation, polymers of amines containing aliphatic unsaturation, and polymers of amides containing aliphatic unsaturation.

DAVID T. MOWRY.
ROSS M. HEDRICK.

References Cited in the file of this patent

UNITED STATES PATENTS

| Number | Name | Date |
|---|---|---|
| 2,582,194 | Dudley | Jan. 8, 1952 |
| 2,625,471 | Mowry | Jan. 13, 1953 |
| 2,625,529 | Hedrick | Jan. 13, 1953 |

OTHER REFERENCES

Farmers' Bulletin 1545, by U. S. Dept. of Agr., 22 pp. November 1927.

The New Garden Encyclopedia, published 1941 by Wm. H. Wise & Co., N. Y., page 1233, article on Top-dressing.

Taylor, "Encyclopedia of Gardening," published 1948, page 1120, article on Top-dress.